United States Patent [19]

Yoo

[11] Patent Number: 5,555,096
[45] Date of Patent: Sep. 10, 1996

[54] FREQUENCY FOLDING AND UNFOLDING CIRCUITS OF A VIDEO SIGNAL RECORDING/REPRODUCING APPARATUS

[75] Inventor: Jae-chun Yoo, Seoul, Rep. of Korea

[73] Assignee: Samsung Electronics Co., Ltd., Kyungki, Rep. of Korea

[21] Appl. No.: 326,749

[22] Filed: Oct. 20, 1994

Related U.S. Application Data

[63] Continuation of Ser. No. 35,181, Mar. 22, 1993, abandoned.

[30] Foreign Application Priority Data

Mar. 20, 1992 [KR] Rep. of Korea .................. 92-4663

[51] Int. Cl.⁶ ..................................... H04N 9/79
[52] U.S. Cl. ............................. 358/310; 348/427
[58] Field of Search ..................... 358/335, 310, 358/330, 342; 360/9.1; 348/426, 427, 428, 429, 430, 431; H04N 5/76, 9/79, 5/78, 9/81, 9/83, 9/85

[56] References Cited

U.S. PATENT DOCUMENTS

| | | | |
|---|---|---|---|
| 4,831,463 | 5/1989 | Faroudja | 358/310 |
| 4,989,090 | 1/1991 | Campbell et al. | 358/11 |
| 5,031,030 | 7/1991 | Hurst, Jr. | 358/12 |
| 5,063,457 | 11/1991 | Ishikawa et al. | 358/330 |
| 5,113,262 | 5/1992 | Strolle et al. | 358/310 |
| 5,150,210 | 9/1992 | Hoshi et al. | 358/105 |
| 5,187,590 | 2/1993 | Kim | 358/310 |
| 5,191,434 | 3/1993 | Kim | 358/335 |
| 5,229,892 | 7/1993 | Inoue et al. | 360/36.2 |

FOREIGN PATENT DOCUMENTS

| | | | |
|---|---|---|---|
| 482666A | 4/1992 | European Pat. Off. | H04N 9/79 |
| 0499715 | 8/1992 | European Pat. Off. | H04N 9/79 |
| 4134536 | 4/1992 | Germany | H04N 9/83 |
| 2249451 | 5/1992 | United Kingdom | H04N 9/79 |
| 2252004 | 7/1992 | United Kingdom | H04N 9/83 |

*Primary Examiner*—Thai Q. Tran
*Attorney, Agent, or Firm*—Sughrue, Mion, Zinn, Macpeak & Seas

[57] ABSTRACT

Folding and unfolding circuits of a video signal in a video recording/reproducing apparatus for recording a video signal of a full bandwidth including a chroma signal and a luma signal on a recording medium having an effective limited bandwidth and reproducing the recorded luma signal and chroma signal into the video signal of a full bandwidth, use a frequency folding technique by means of sub-Nyquist sampling. A region of a high-frequency signal is folded onto a region of a limited low-frequency luma signal. A remaining high-frequency luma signal is folded on the remaining region of the limited low-frequency luma signal, to thereby record the luma signals according to a field period. The full-bandwidth video signal is then reproduced by band-compensation during reproducing. Thus, crosstalk between channels is decreased to thereby obtain a clear picture of high resolution.

26 Claims, 5 Drawing Sheets

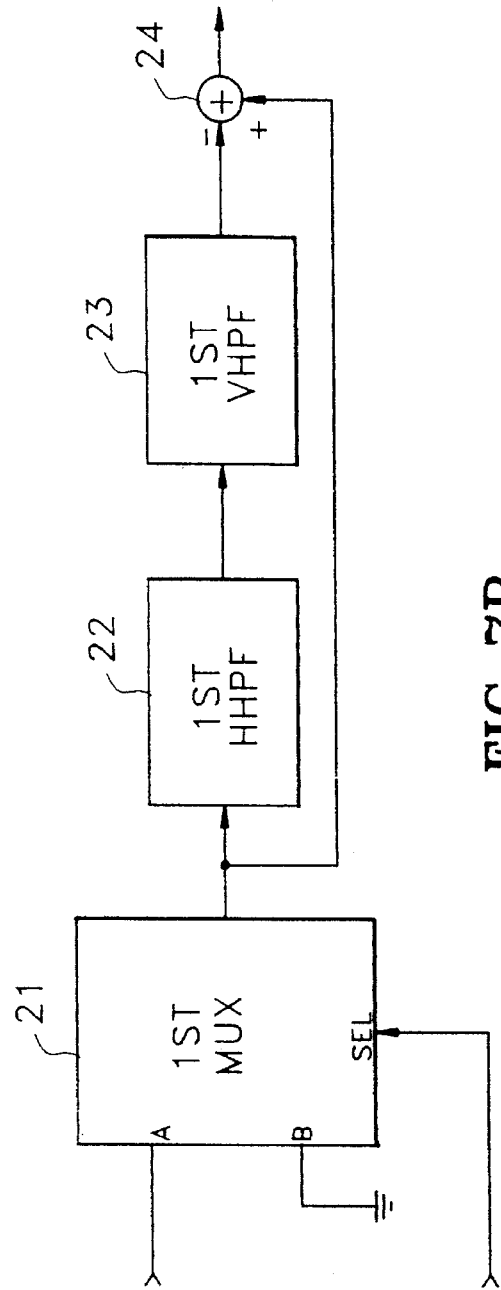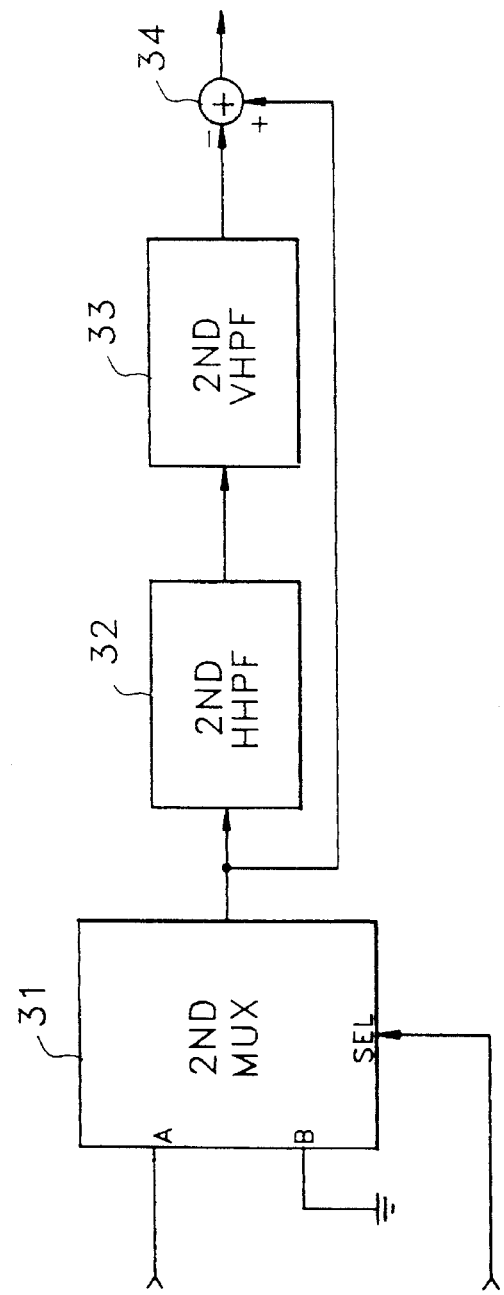

5,555,096

FREQUENCY FOLDING AND UNFOLDING CIRCUITS OF A VIDEO SIGNAL RECORDING/REPRODUCING APPARATUS

This is a Continuation of application Ser. No. 08/035,181, filed Mar. 22, 1993 now abandoned.

BACKGROUND OF THE INVENTION

The present invention relates to folding and/or unfolding circuits of a video signal in a video recording/reproducing apparatus which employs a frequency folding technique for recording a video signal of a full bandwidth on a recording medium, and more particularly to folding and/or unfolding circuits of a video signal, wherein, in order to decrease crosstalk between channels, a portion of a high-frequency luma signal band is folded on a portion of a low-frequency luma band of a limited bandwidth and the remaining high-frequency luma signal is folded on the remaining band of the low-frequency luma signal by a preset period, and then the folded video signals are unfolded into the full bandwidth.

A conventional video recording/reproducing apparatus using a frequency folding technique to record a video signal of a full bandwidth on a recording medium is described in U.S. patent application Ser. No. 07/569,029 filed by Samsung Electronics Co., Ltd. of Korea. According to the above patent application, the video signal of a full bandwidth is supplied via an encoder for generating a predetermined signal which has a low-frequency component by folding a high-frequency component signal having a decreased amplitude on the low-frequency component by means of sub-Nyquist sampling. Signals from the encoder are then recorded onto a video cassette. Here, the folded high-frequency component having decreased amplitude can be restored, and thus the video signal of the full bandwidth is reproduced.

According to an apparatus and method described in U.S. Pat. No. 4,831,463, before being passed through a bandwidth or medium which degrades resolution, a luma high-frequency component is folded on a mid-band spectrum and the original signal is then restored by unfolding the luma high-frequency component. Here, in order to provide for a narrower television signal bandwidth, the high-frequency component is processed in the mid-band spectrum by means of a comb filter and sub-Nyquist sampling.

However, the apparatuses described above have a problem in that picture quality is degraded due to crosstalk caused by the high-frequency luma component being loaded on the low-frequency band, while transmitting the folded video signal of one field recorded onto the recording medium by channels.

SUMMARY OF THE INVENTION

It is an object of the present invention to solve the above-described problem.

It is an object of the present invention to provide a folding and/or unfolding circuit of a video signal in a video recording/reproducing apparatus which uses a frequency folding technique to record and/or reproduce a full-bandwidth video signal, wherein, in order to decrease crosstalk between channels, a video signal is alternately recorded by folding a portion of the high-frequency luma signal on a portion of a low-frequency luma signal of a limited bandwidth and folding the remaining high-frequency luma signal on the remaining band of the low-frequency luma signal by a preset period, and then reproducing the full-bandwidth video signal.

To achieve the above object of the present invention, there is provided a video recording apparatus for recording a full-bandwidth video signal including a chroma signal and luma signal on a recording medium having an effective limited bandwidth, wherein a video signal folding circuit comprises:

an input terminal for receiving the video signal from a signal supply source;

a first frequency folder for separating a predetermined first high-frequency luma signal from the video signal input via the input terminal to fold the separated signal on a first low-frequency luma band, thereby generating a folded luma signal having a limited bandwidth;

a second frequency folder for separating the remaining second high-frequency luma signal while excluding the first high-frequency luma band in the video signal from the input terminal to fold the remaining signal on a second low-frequency luma band and not on the first low-frequency luma band, thereby generating a folded luma signal having a limited bandwidth; and a luma signal recorder alternately recording the signal obtained by folding the predetermined first high-frequency luma signal from the first frequency folder on the first low-frequency luma band, and the signal obtained by folding the predetermined second high-frequency luma signal from the second frequency folder on the second low-frequency luma band, on the recording medium by a preset period.

Also, there is provided a video reproducing apparatus for reproducing recorded information as a video signal of a full bandwidth after alternately recording a luma signal obtained by folding a first high-frequency luma signal occupying a portion of a high-frequency luma band on a limited first low-frequency band and a luma signal obtained by folding a second high-frequency luma signal occupying the remaining high-frequency luma band on the remaining region of a limited second low-frequency band, on a recording medium having an effective limited bandwidth by a predetermined period, wherein a video signal unfolding circuit comprises:

a readout device for reproducing the information recorded on the recording medium;

a first frequency unfolder for unfolding the first high-frequency luma signal folded on the limited low-frequency luma band to its originally occupied band among signals reproduced by the readout device in a first predetermined field; and a second frequency unfolder for unfolding the second high-frequency luma signal folded on the limited low-frequency luma band to its originally occupied band among signals reproduced by the readout device in a second predetermined field.

Furthermore, there is provided a video recording/reproducing apparatus for recording a full-bandwidth video signal having a chroma signal and luma signal on a recording medium of an effective limited bandwidth, and reproducing the recorded luma and chroma signals into a full-bandwidth video signal, wherein a folding/unfolding circuit of a video signal comprises:

an input terminal for receiving a video signal from a signal supply source;

a first frequency folder for separating a predetermined first high-frequency luma signal from the video signal input via the input terminal to fold the separated signal on a first low-frequency luma band, thereby generating a folded luma signal having a limited bandwidth;

a second frequency folder for separating the remaining second high-frequency luma signal while excluding the first high-frequency luma band in the video signal from the input terminal to fold the remaining signal on a second low-frequency luma band and not on the first low-frequency luma band, thereby generating a folded luma signal having a limited bandwidth;

a luma signal recorder for alternately recording the luma signal obtained by folding the predetermined first high-frequency luma signal on the first low-frequency luma band and output from the first frequency folder and the luma signal obtained by folding the predetermined second high-frequency luma signal on the second low-frequency luma band and output from the second frequency folder, on the recording medium by a preset period;

a readout device for reproducing information recorded on the recording medium;

a first frequency unfolder for unfolding the first high-frequency luma signal folded on the limited first low-frequency luma band to its originally occupied band among signals reproduced by the readout device in a first predetermined field; and a second frequency unfolder for unfolding the second high-frequency luma signal folded on the second limited low-frequency luma band to its originally occupied band among signals reproduced by the readout device in a second predetermined field.

BRIEF DESCRIPTION OF THE DRAWINGS

The above objects and other advantages of the present invention will become more apparent by describing in detail a preferred embodiment thereof with reference to the attached drawings in which:

FIG. 7A is a detailed block diagram showing the temporally adaptive unfolder shown in FIG. 6; and FIG. 7B is a detailed block diagram showing the spatially adaptive unfolder shown in FIG. 6.

DETAILED DESCRIPTION OF THE INVENTION

Figure 1:
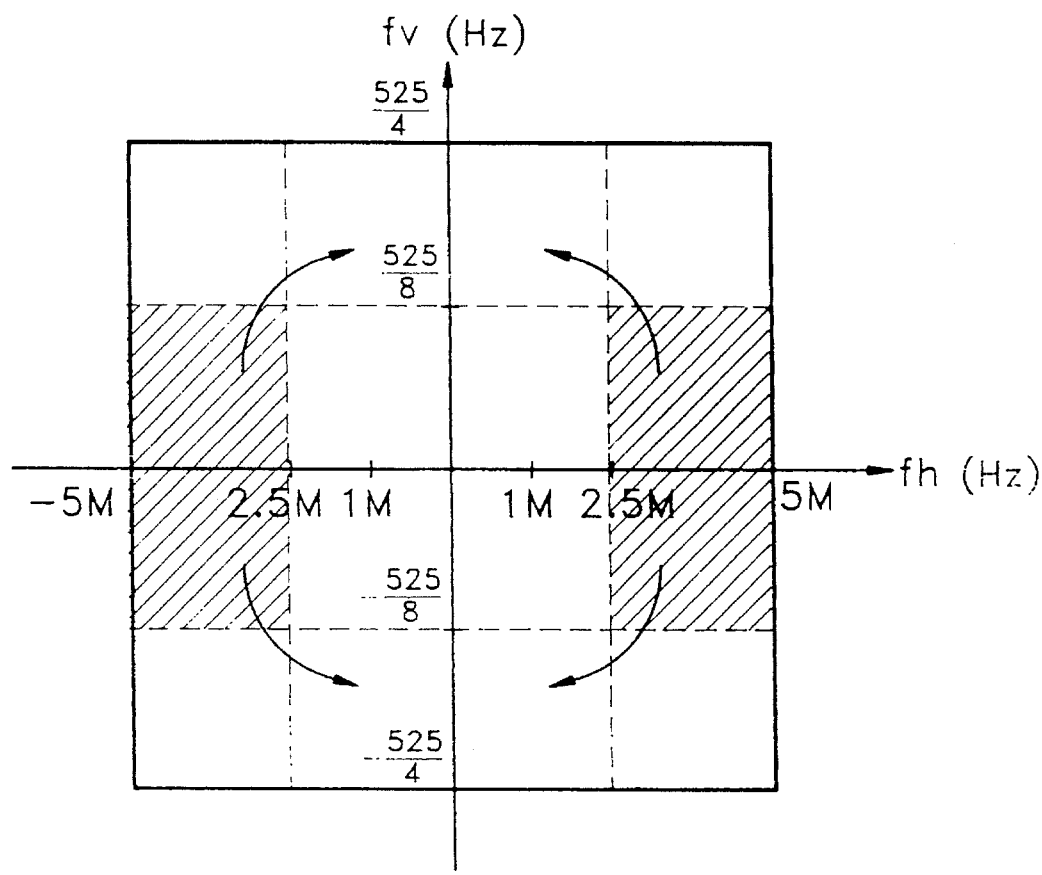
FIG. 1 is a diagram for explaining the band of an NTSC video signal distributed on the horizontal and vertical axes to assist the understanding of the present invention.

As shown in FIG. 1, a TV signal of the NTSC system exists within ±5 MHz along the horizontal frequency axis, and within ±525/4 fv(Hz) along the vertical frequency axis, where fv is a vertical frequency (60 Hz for NTSC and 50 Hz for PAL).

That is, the frequency folding technique is employed to reproduce a TV signal of a limited bandwidth into a signal of a full bandwidth in such a manner that high-frequency luma signals (oblique-lined portions) positioned below one half of a maximum vertical frequency in the vertical axis and within 2.5 MHz to 5 MHz in the horizontal axis are relocated in the direction designated by arrows by eliminating low-frequency luma components positioned beyond the half-way point of the maximum vertical frequency in the vertical axis and within 1 MHz to 2.5 MHz in the horizontal axis, thereby being folded on the low-frequency luma band.

Figure 2:
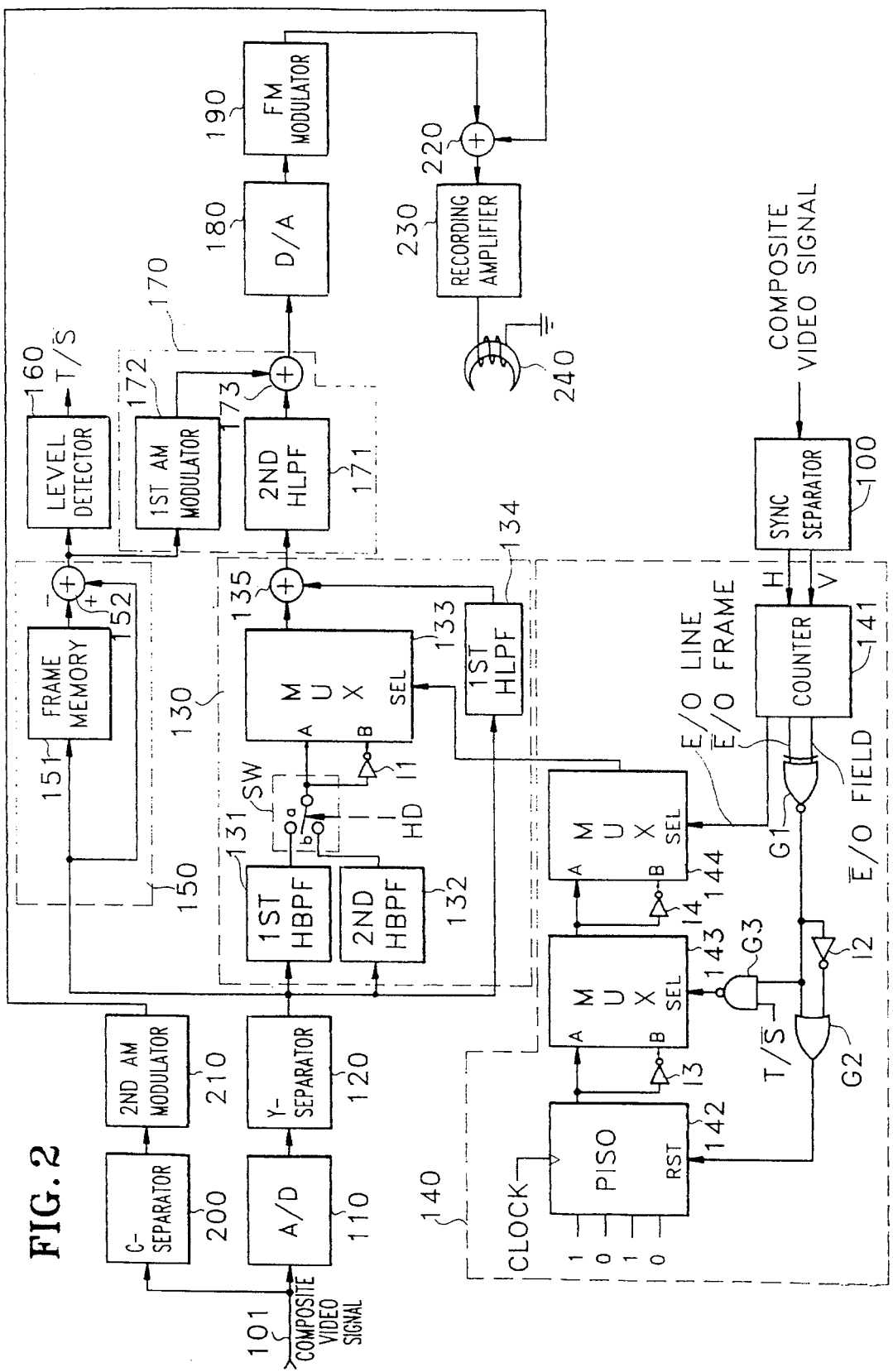
FIG. 2 is a circuit diagram showing one embodiment of a folding circuit of a video signal according to the present invention.

FIG. 2 is a circuit diagram showing an embodiment of a folding circuit of a video signal according to the present invention.

In FIG. 2, an input terminal 101 is connected to a video signal supply source (not shown) to receive a composite video signal, and to inputs of a sync separator 100, an analog-to-digital (A/D) converter 110 and a chroma separator (C-separator 200). The input of a luma signal separator (Y-separator) 120 is connected to the output of A/D converter 110, and its output is connected to first and second horizontal bandpass filters (HBPF) 131 and 132 and a first horizontal low-pass filter (HLPF) 134.

A first selective contact point "a" of a control switch SW is connected to the output of first HBPF 131, its second selective contact point "b" is connected to the output of second HBPF 132, its control contact point is connected to a terminal for outputting a head-switching signal HD of a servo (not shown), and its output is connected to a first input (A) of a multiplexer 133 and the input of an inverter I1.

A second input (B) of multiplexer 133 is connected to the output of inverter I1, with its output being connected to a first input of an adder 135. A second input of adder 135 is connected to the output of first HLPF 134, and the adder 135's output is connected to the input of a second HLPF 171. First and second HBPFs 131 and 132, control switch SW, multiplexer 133, first HLPF 134 and adder 135 correspond to a frequency folder 130.

The first and second inputs of a counter 141 constituting a discriminator are connected to horizontal and vertical sync signal outputs of sync signal separator 100, its first and second outputs are connected to first and second inputs of an exclusive NOR gate 131, and its third output is connected to the selection terminal SEL of a multiplexer 144. The output of exclusive NOR gate G1 is connected to a first input of an OR gate G2, the input of an inverter I2 and the first input of a NAND gate G3. A second input of OR gate G2 is connected to the output of inverter I2, and its output is connected to the reset terminal of a parallel-in-serial-out converter (PISO) 142. A second input of NAND gate G3 is connected to the output T/S (temporal/spatial) of a level detector 160, and its output is connected to the selection terminal SEL of a multiplexer 143.

The first through fourth inputs of PISO 142 are set to binary digits "1010," its clock terminal is connected to the output of an unshown clock generator for generating a 10 MHz clock signal, its first output is connected to the first input (A) of multiplexer 143, and its second output is connected to the input of an inverter I3. A second input (B) of multiplexer 143 is connected to the output of inverter I3, and its output is connected to the first input (A) of multiplexer 144 and the input of an inverter I4. A second input (B) of multiplexer 144 is connected to the output of inverter I4, and its output is connected to the selection terminal SEL of multiplexer 133. Counter 141, PISO 142, multiplexers 143 and 144, inverters I2, I3 and I4, exclusive NOR gate G1, OR gate G2 and NAND gate G3 constitute a modulated-pulse generator (MPG) 140.

The input of a frame memory 151 is connected to the output of Y-separator 120, and its output is connected to the subtrahend terminal of a subtractor 152. The minuend terminal of subtractor 152 is connected to the output of Y-separator 120, and its output is connected to the inputs of level detector 160 and a first AM modulator 172. Frame memory 151 and subtractor 152 constitute a motion signal detector 150.

A first input of an adder 173 is connected to the output of second HLPF 171, its second input is connected to the output of first AM modulator 172, and its output is connected to the input of a D/A converter 180. Second HLPF 171, first AM modulator 172 and adder 173 correspond to a luma/motion signal mixer 170.

The input of an FM modulator 190 is connected to the output of D/A converter 180, and its output is connected to the first input of an adder 220. The input of second AM modulator 210 is connected to the output of a C-separator 200, and its output is connected to the second input of adder 220. A first input of a recording amplifier 230 is connected to the output of adder 220, and its output is coupled to a recording head 240.

Hereinbelow, the operation of the apparatus shown in FIG. 2 will be described.

A/D converter 110 receives the composite video signal of the standard full bandwidth of the NTSC system, and converts it into the form of sampled data, i.e., a multi-bit digital signal. A selected sampling frequency is roughly 10 MHz for the NTSC system.

Y-separator 120 separates a luma signal component from the digital composite video signal from A/D converter 110, and supplies the luma signal to first and second HBPF 131 and 132.

Figure 4A:
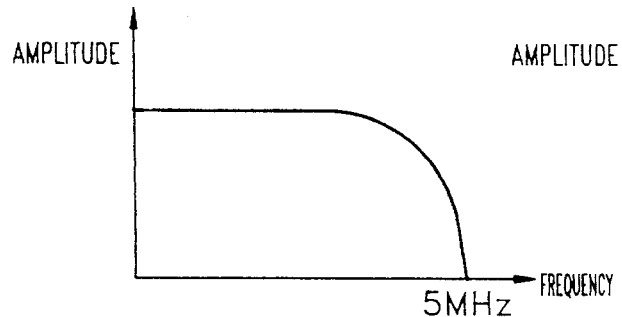
FIGS. 4A through 4F show characteristics of the signals output from certain parts of the circuit shown in FIG. 2.
Figure 4B:
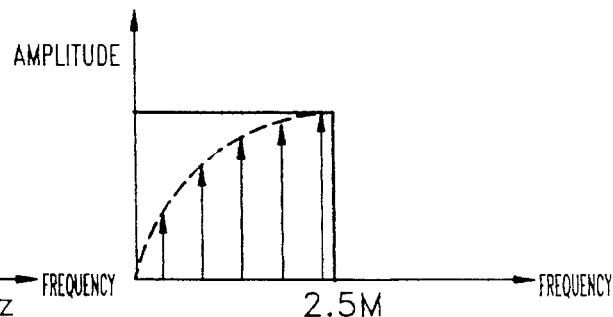
Figure 4C:

First HBPF 131 detects only a luma signal within the range of 2.5 MHz to 3.7 MHz as shown in FIG. 4C in the luma signal of the 5 MHz full bandwidth from Y-separator 120 as shown in FIG. 4A. In this case, as shown in FIG. 4B, a conventional frequency folder folds the high-frequency luma signal within 2.5 MHz to 5 MHz on tNe low-frequency band within 2.5 MHz.

Figure 4D:
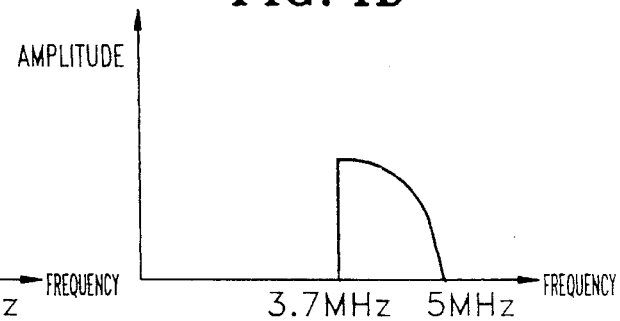

Second HBPF 132 detects only a luma signal corresponding to 3.7 MHz to 5 MHz shown in FIG. 4D in the luma signal of the full bandwidth (FIG. 4A). Control switch SW selects first HBPF 131 when the head switching pulse having a frequency of 30 Hz is logic "high" in the odd field, and second HBPF 132 when the head switching pulse is logic "low" in the even field. The output signal of first or second HBPF 131 or 132 selected by control switch SW is supplied to multiplexer 133.

A folding clock signal having a frequency one half that of the sampling clock is supplied to the selection terminal SEL (the control input) of multiplexer 133.

Here, counter 141 of MPG 140 for generating the folding clock signal receives the composite video signal from the signal supply source, and then counts the horizontal (H) and vertical (V) sync signals from sync signal separator 100 for separating the horizontal and vertical sync signals H and V which are pre-loaded on the composite video signal.

Counter 141 allows a control signal E/O FRAME for discriminating either an odd or an even frame and a control signal E/O FIELD for discriminating either an odd or an even field within one frame to be input to exclusive NOR gate G1, and a control signal E/O LINE for discriminating between odd and even lines within a field to be input to the selection terminal SEL of multiplexer 144.

OR gate G2 and inverter I2 detect changes whenever the output of exclusive NOR gate G1 is altered, i.e., for even/odd field changes and even/odd frame changes, thereby resetting PISO 142. PISO 142 alternately outputs the clock signal shown in FIG. 3A to first input (A) of multiplexer 143, and the clock signal shown in FIG. 3B to the second input (B) of multiplexer 143 via inverter I3.

Figure 3A:
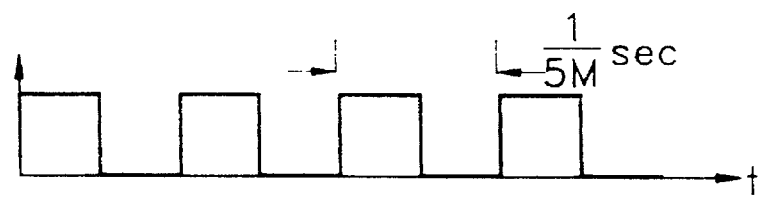
FIGS. 3A and 3B are timing charts of a signal generated in the modulated pulse generator shown in FIG. 2.
Figure 3B:
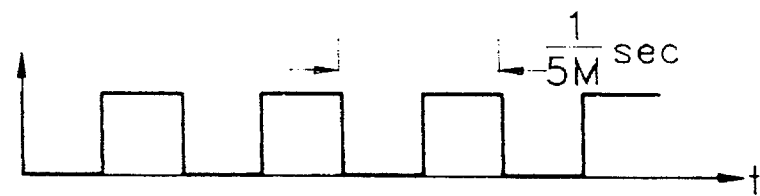

Multiplexer 143 selects the clock signal shown in FIG. 3A input to first input (A) or the clock signal shown in FIG. 3B input to second input (B) via inverter I3, in accordance with the output of NAND gate G3 which performs a NAND operation of the outputs from exclusive NOR gate G1 and level detector 160, and then supplies the selected clock signal to first input (A) of multiplexer 144 and second input (B) thereof via inverter I4.

The outputs of NAND gate G3 and mulitiplexer 143 can be written as follows:

TABLE 1

| FRAME | ODD | | EVEN | |
|---|---|---|---|---|
| FIELD | ODD | EVEN | ODD | EVEN |
| output of NAND gate (G3) | | | | |
| T/S̄ = 1 | 1 | 0 | 0 | 1 |
| output of multiplexer (143) | | | | |
| T/S̄ = 1 | A | B | B | A |
| T/S̄ = 0 | A | A | A | A |

That is, the signal input to the selection terminal SEL of multiplexer 133 becomes a folding frequency which is the 5 MHz clock signal. In accordance with the output of a variation detector (G2 and I2), the clock signal from PISO 142, i.e., the 5 MHz clock signal, is that shown in FIG. 3A in case of the odd frame and odd field or even frame and even field, or that shown in FIG. 3B in case of the even frame and odd field or odd frame and even field. Accordingly, multiplexer 133 performs horizontal modulation in accordance with 5 MHz clock signal of PISO 142.

Here, a motion signal which represents the amount of movement is detected in such a manner that a luma signal of one frame separated from Y-separator 120 is delayed by means of frame memory 151, and subtractor 152 detects a difference component obtained by subtracting the luma signal of the immediately preceding frame from the luma signal of the current frame output from Y-separator 120. Thus, the difference component becomes the motion signal.

Level detector 160 compares the motion signal from subtractor 152 with a preset threshold. Then, since the luma signal is a spatially extracted signal when the motion signal is greater than the threshold, the luma signal is horizontally and vertically modulated to thereby generate a logic "low" spatial control signal S for frequency folding. In the meantime, since the luma signal is a temporally extracted signal when the motion signal is smaller than the threshold, the luma signal is modulated in the horizontal, vertical and temporal axes to thereby generate a logic "high" temporal control signal T for frequency folding. Thus, the level detector 160 provides the logic signals to the first input of NAND gate G3.

If the signal from level detector 160 is a logic "high," the signal temporally has slight motion (i.e., for a still picture). In this state, multiplexer 143 folds the high-frequency luma signal on a Fukinuki hole by time-axis processing. That is, since the high-frequency luma signal exists in 15 Hz with respect to the time axis, either the inverted output (FIG. 3B) or non-inverted output (FIG. 3A) of PISO 142 is selected in the field unit, thereby relocating the luma signal of the oblique-lined high-frequency area shown in FIG. 1 to the horizontal low-frequency area by means of field offset sampling. Here, the high-frequency luma signal sampled by being offset in the field unit is placed around the Fukinuki hole far from the luma signal of the reference area with respect to the time axis.

If the signal from level detector 160, i.e., temporal/spatial control signal T/S of NAND gate G3, is a logic "low," the signal has great motion (i.e., for a motion picture), so that the high-frequency luma signal is folded by means of spatial processing. Also, the signal shown in FIG. 3A is output from multiplexer 143. Thus, time-axis modulation is not carried out. In other words, since the offset sampling between fields is not carried out when the amount of motion is great, multiplexer 143 selects first input (A) for receiving the output (FIG. 3A) of PISO 142, and multiplexer 144 inverts the output of PISO 142 per line according to control signal E/O LINE which is input to the selection terminal SEL of multiplexer 144. Accordingly, multiplexer 133 performs vertical modulation.

Upon receiving control signal E/O LINE for discriminating the odd and even lines at its selection terminal SEL, multiplexer 144 selects the output or the inverted output of multiplexer 143, and supplies the selected output to the selection terminal SEL of multiplexer 133. This is done for the purpose of modulating the high-frequency luma signal vertically having a frequency within one half the maximum vertical frequency to the low-frequency luma band which has a vertical frequency greater than one half the maximum vertical frequency.

Briefly, the output of PISO 142 becomes the modulation signal for modulating with respect to the horizontal axis, the output of multiplexer 143 is the modulation signal for modulating with respect to the time axis, and the output of multiplexer 144 is the modulation signal for modulating with respect to the vertical axis.

Therefore, the temporarily processed still picture is modulated with respect to the horizontal, vertical and time axes, and the spatially processed motion picture is modulated in the horizontal and vertical axes.

Figure 4E:
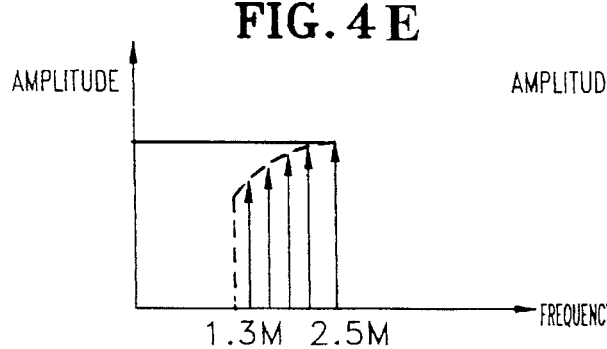
Figure 4F:
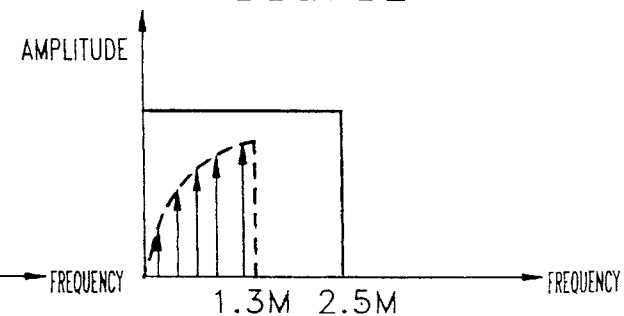
Figure 5A:
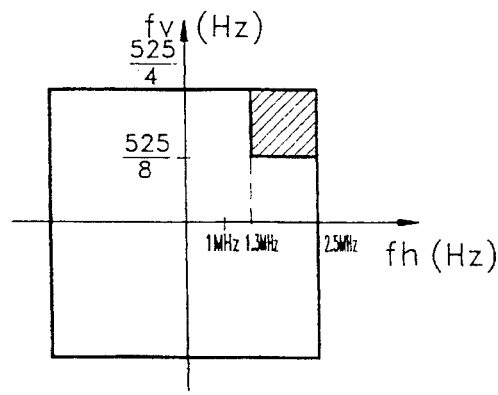
FIGS. 5A and 5B are diagrams for explaining the frequency band of the signal from the circuit shown in FIG. 2, which is distributed on the horizontal and vertical axes.
Figure 5B:
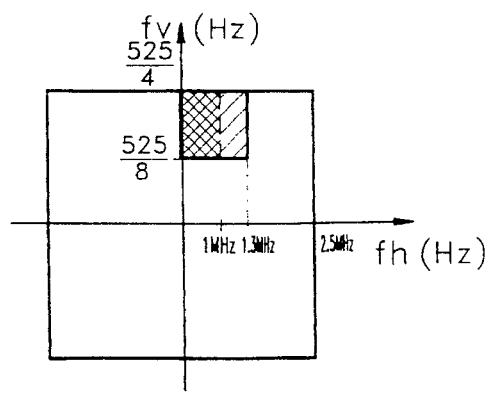

During the odd field, a signal (FIG. 4E) is obtained by folding the output signal (FIG. 4C) of first HBPF 131 on the low-frequency band within 2.5 MHz from first HLPF 134 via adder 135. Meanwhile, during the even field, a signal (FIG. 4F) is obtained by folding the output signal (FIG. 4D) of second HBPF 132 on the low-frequency area within 2.5 MHz from first HLPF 134 via adder 135. FIG. 5A illustrates the characteristic of the signal shown in FIG. 4E unfolded with respect to the horizontal and vertical axes. FIG. 5B illustrates the characteristic of the signal shown in FIG. 4F unfolded with respect to the horizontal and vertical axes.

As described above, the signal obtained by transiting the high-frequency luma signal in the temporarily or spatially varying luma signal to the low-frequency luma band is added to the output of first HLPF 134, thereby outputting the obtained signal to second HLPF 171. First AM modulator 172 performs AM modulation to allow the motion signal from motion signal detector 150 to be present in a predetermined frequency band (e.g., the central frequency is 250 KHz). Adder 173 adds the folded luma signal from second HLPF 171 to the motion signal from first AM modulator 172.

D/A converter 180 converts the output signal of adder 173 into an analog signal form to thereby output the converted signal to FM modulator 190.

FM modulator 190 performs the frequency modulation of the analog luma signal from D/A converter 180, thereby outputting the frequency-modulated signal to the first input of adder 220.

Meanwhile, after C-separator 200 separates the chroma signal from the composite video signal, second AM modulator 210 AM modulates the chroma signal having a 629 KHz component, thereby outputting the modulated signal to the second input of adder 220.

Adder 220 adds the luma signal of FM modulator 190 to the AM-modulated chroma signal from second AM modulator 210. Then, the result is loaded on the recording medium via recording amplifier 230 by means of recording head 240.

Figure 6:
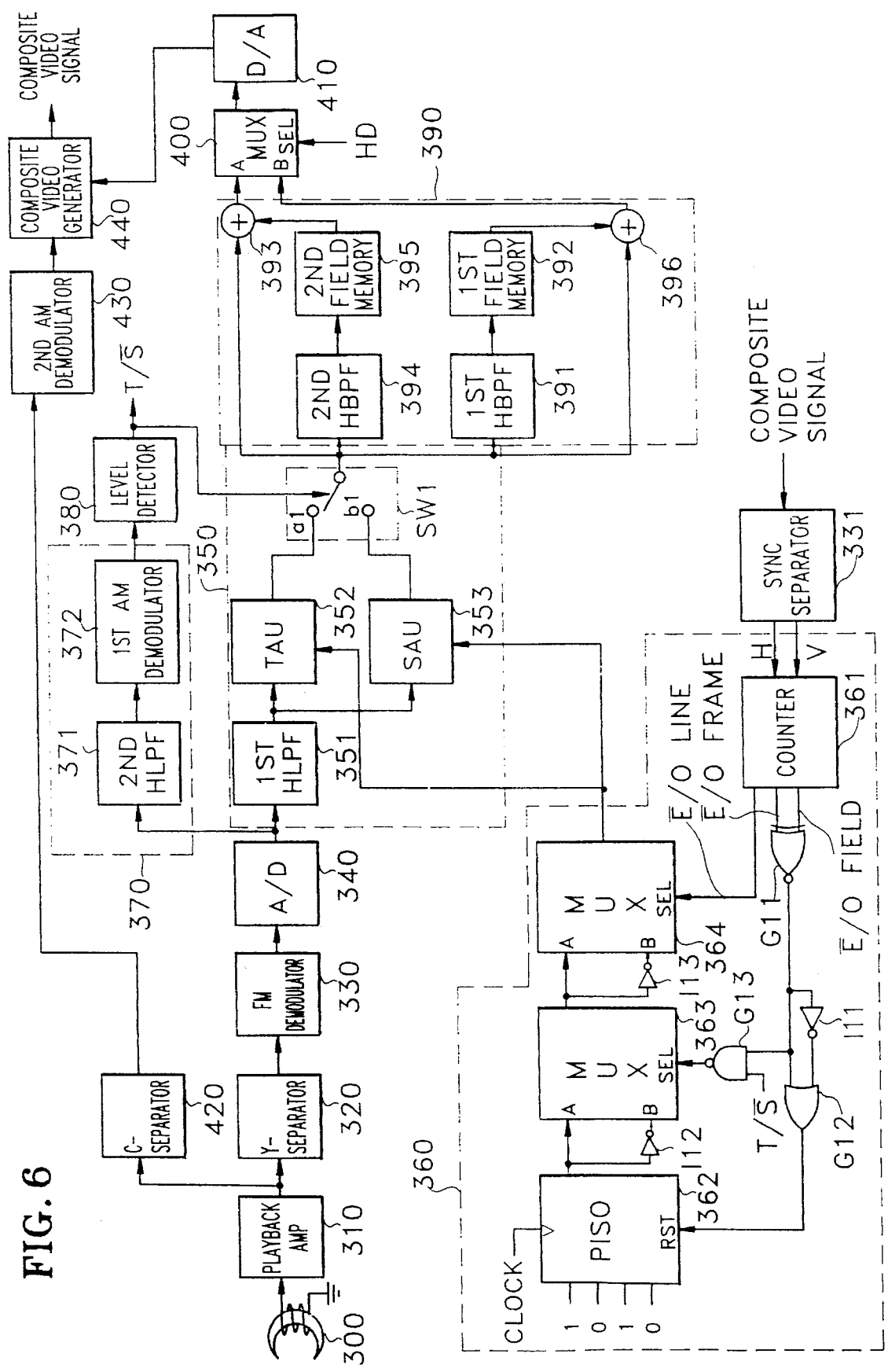
FIG. 6 is a detailed circuit diagram showing one embodiment of an unfolding circuit of a video signal according to the present invention.

FIG. 6 is a circuit diagram showing the construction of the unfolding circuit of a video signal according to the present invention.

In FIG. 6, a playback head 300 is incorporated with a standard tape transferring device (not shown) of a standard VCR. The playback signal output of playback head 300 is connected to the input of a playback amplifier 310. The input of a luma signal separator 320 is connected to the output of playback amplifier 310, and its output is connected to the input of an FM demodulator 330.

The input of an A/D converter 340 is connected to the output of FM demodulator 330, and its output is connected to a first HLPF 351. The input of a temporally adaptive unfolder (TAU) 352 is connected to the output of first HLPF 351, its output is connected to a first selection contact point "a1" of a control switch SW1, and its control input terminal is coupled to the output of a modulated-pulse generator (MPG) 360.

The input of a spatially adaptive unfolder (SAU) 353 is connected to the output of first HLPF 351, its output is connected to a second selection contact point "b1" of control switch SW1, and its control input terminal is also coupled to the output of MPG 360.

FIG. 7A illustrates the construction, of TAU 352 in detail. Here, a first input (A) of a first multiplexer 21 is connected to the output of HLPF 351, a second input (B) is grounded, its selection terminal SEL is connected to the output of a multiplexer 364 of MPG 360, and its output is connected to a first HHPF 22. The input of a first vertical high-pass filter (VHPF) 23 is connected to the output of first HHPF 22, and its output is connected to the subtrahend terminal of a first subtractor 24. The minuend terminal of first subtractor 24 is connected to the output of first multiplexer 21, and its output is coupled to first selection contact "a1" of control switch SW1.

FIG. 7B illustrates the construction of SAU 353 in detail. A first input (A) of a second multiplexer 31 is connected to the output of first HLPF 351, a second input (B) is grounded, its selection terminal SEL is connected to the output of multiplexer 364 of MPG 360, and its output is connected to a HHPF 32. The input of a second VHPF 33 is connected to the output of second HHPF 32, and its output is connected to the subtrahend terminal of a second subtractor 34. The minuend terminal of second subtractor 34 is connected to the output of second multiplexer 31, and its output is connected to second selection contact point "b1" of control switch SW1.

First HLPF 351, TAU 352, SAU 353 and control switch SW1 correspond to a frequency unfolder 350.

The construction of MPG 360 is the same as MPG 140 shown in FIG. 2.

The input of a second HLPF 371 is connected to the output of A/D converter 340, and its output is connected to the input of a first AM demodulator 372. The input of a level detector 380 is connected to the output of first AM demodulator 372, and its output is connected to a control contact point of control switch SW1 and the first input of a NAND gate G13 of MPG 360. Second HLPF 371 and first AIVI demodulator 372 constitute a motion signal separator 370.

The inputs of first and second HBPF 391 and 394 are coupled to a fixed contact point of control switch SW1. The output of first HBPF 391 is connected to the input of a first field memory 392. The output of second HBPF 394 is connected to the input of a second field memory 395. A first input of an adder 393 is coupled to the fixed contact point of control switch SW1, its second input is connected to the output of second field memory 395, and its output is connected to a first input (A) of a multiplexer 400. A first input of an adder 396 is coupled to the fixed contact point of control switch SW1, its second input is connected to the output of first field memory 392, and its output is connected to the second input (B) of multiplexer 400. First and second HBPFs 391 and 394, field memories 392 and 395, and adders 393 and 396 correspond to a frequency compensator 390.

The selection terminal SEL of multiplexer 400 is coupled to an output of 30 Hz head-switching signal HD of a servo, and its output is connected to the input of a D/A converter 410.

The input of a C-separator 420 is connected to the output of playback amplifier 310, and its output is linked with a second AM demodulator 430. A first input of a composite video signal generator 440 is connected to the output of second AM demodulator 430, and its second input is connected to the output of D/A converter 410.

Hereinbelow, the operation of the circuit shown in FIG. 6 will be described.

Referring to FIG. 6, playback head 300 is incorporated with a standard tape transmission device (not shown) of a standard VCR. Playback amplifier 310 amplifies the signal reproduced from playback head 300 and supplies the amplified signal to Y-separator 320. Y-separator 320 separates a luma signal Y from the composite video signal output from playback amplifier 310, so that luma signal Y is output to FM demodulator 330.

A/D converter 340 receives the luma signal Y of the NTSC system which has a limited bandwidth (e.g., approximately 2.5 MHz) from FM demodulator 330, and then converts the received signal into the form of sampled data, i.e., a multi-bit digital signal. The selected sampling frequency is roughly 10 MHz for NTSC systems.

First, motion signal separator 370 outputs only the low-frequency luma signal below a predetermined band (center frequency: 250 KHz) in luma signal Y from A/D converter 340 to first AM demodulator 372 via second HLPF 371. First AM demodulator 372 detects an AM-demodulated motion signal, using such as an envelope detector.

Level detector 380 compares the level of the detected motion signal with a preset threshold. When the motion signal level is greater than the threshold, level detector 380 outputs a logic "low" control signal indicating that the reproduced luma signal is spatially extracted (for a luma signal of a temporally varying motion picture), and when the motion signal level is lower than the threshold, outputs a logic "high" control signal indicating that the reproduced luma signal is temporally extracted (for an unchanging still picture).

The luma signal from A/D converter 340, is supplied to frequency unfolder 350. Specifically, the A/D converter 340 supplies the luma signal component below 2.5 MHz to TAU 352 and SAU 353 via first HLPF 351.

In TAU 352 as shown in FIG. 7A, first multiplexer 21 functioning as a modulator selects the output of first HLPF 351 entering via its first input (A) in the odd clock signal interval, and zero, i.e., the grounded second input (B), in the even clock signal interval, in accordance with the clock signal which is half the sampling frequency. Thus, the 0–5 MHz luma signal is modulated by being folded such that the luma signal at 0 Hz becomes 5 MHz and the luma signal at 2.5 MHz becomes 2.5 MHz (folds into itself), so that the high frequency luma signal folded on the low-frequency luma band is unfolded back to the 5 MHz bandwidth.

First HHPF 22 outputs a luma signal beyond 2.5 MHz among the 5 MHz bandwidth luma signal output from first multiplexer 21 to first VHPF 23. First VHPF 23 outputs only the luma signal vertically greater than one half the maximum frequency in the high-frequency luma signal greater than 2.5 MHz to the subtrahend terminal of first subtractor 24. First subtractor 24 subtracts the output signal of first VHPF 23 from the luma signal of the full bandwidth output from first multiplexer 21. This subtraction operation is performed because the chroma signal is loaded on the frequency band horizontally greater than 2.5 MHz and vertically greater than one half the maximum vertical frequency. The subtracted luma signal is supplied to selective contact point "a1" of control switch SW1. Here, the supplied signal is the luma signal processed in the time axis during recording (i.e., a signal modulated with respect to the horizontal, vertical and time axes). At this time, the modulating clock input to the selection terminal SEL of first multiplexer 21 is generated from MPG 360. Also, the operation of the MPG 360 is the same as MPG 140 shown in FIG.

In SAU 353, second multiplexer 31 functioning as a modulator selects the output of first HLPF 351 entered via its first input (A) in the odd clock signal interval, and zero, i.e., its grounded second input (B) in the even clock signal interval according to a clock signal (5 MHz) having a frequency half of the sampling frequency (e.g., 10 MHz). Thus, luma signal of 0 Hz is modulated into 5 MHz, and luma signal of 2.5 MHz is modulated into 2.5 MHz. The high-frequency luma signal folded on low-frequency luma band is thus unfolded back to the original 5 MHz bandwidth. Among the 0–5 MHz luma signal from second multiplexer 31, second HHPF 32 outputs the luma signal component greater than 1 MHz. Also, second VHPF 33 outputs only the luma signal whose frequency is vertically greater than one half the maximum frequency in the luma signal horizontally greater than 1 MHz to the subtrahend terminal of second subtractor 34. Second subtractor 34 subtracts the output signal of second VHPF 33 from the luma signal of the full bandwidth from second multiplexer 31. This subtracting operation is performed because the chroma signal is loaded on the band obtained by subtracting the frequency component horizontally greater than 1 MHz and vertically greater than one half the maximum vertical frequency band. The subtracted luma signal which is not temporally processed during recording, i.e., a horizontally and vertically modulated signal, is supplied to selection contact point "b1" of control switch SW1. Here, the modulated clock input to the selection terminal SEL of second multiplexer 31 is generated in MPG 360. The operation of MPG 360 is the same as MPG 140 in FIG. 2.

Control switch SW1 selects either the output of TAU 352 or the output of SAU 353, according to temporal/spatial control signal T/S̄ from level detector 380, and outputs the selected output to the inputs of first and second BPF 391 and 394.

First HBPF 391 passes the high-frequency luma signal component between 2.5 MHz and 3.7 MHz in the low and high-frequency luma signals selected by means of control switch SW1, and supplies the obtained signal to first field memory 392. At this time, if the signal is stored in first field memory 392, the field is odd.

Second HBPF 394 passes the high-frequency luma signal component between 3.7 MHz and 5 MHz in the low and high-frequency luma signals selected by means of control switch SW1, and supplies the obtained signal to second field memory 395. At this time, if the signal is stored in second field memory 395, the field is even.

First adder 393 adds the luma signal from control switch SW1 to the 3.7~5 MHz high-frequency luma signal component stored in second field memory 395, thereby outputting the result to the first input (A) of multiplexer 400.

Second adder 396 adds the luma signal from control switch SW1 to the 2.5~3.7 MHz high-frequency luma signal component stored in first field memory 392 to thereby output the result to the second input (B) of multiplexer 400.

In the odd field, since a logic "high" of the 30 Hz head-switching signal is input to its selection terminal SEL, multiplexer 400 outputs a signal from its first input (A) obtained by adding the low-frequency luma signal below 2.5 MHz and the 2.5~3.7 MHz high-frequency luma signal which are reproduced during the odd field, to the 3.7~5 MHz high-frequency luma signal stored in second field memory 395.

In the even field, since a logic "low" of the 30 Hz head-switching signal is input to its selection terminal SEL, multiplexer 400 outputs a signal from its second input (B) obtained by adding the low-frequency luma signal below 2.5 MHz and the 3.7~5 MHz high-frequency luma signal which is reproduced during the even field, to 2.5~3.7 MHz high-frequency luma signal stored in first field memory 392.

D/A converter 410 converts the digital luma signal from multiplexer 400 into an analog signal.

Meanwhile, C-separator 420 separates the chroma signal from the composite video signal reproduced from playback amplifier 310, and then second AM demodulator 430 demodulates the chroma signal C having a 629 KHz component into 3.58 MHz signal.

Composite video signal generator 440 operates in a typical manner for combining the luma signal from D/A converter 410 with the chroma signal from second AM demodulator 430 in order to form a standard composite video signal.

As described above, in a video recording/reproducing apparatus using a folding technique wherein, in order to fold a video signal of a full bandwidth onto a limited bandwidth, the high-frequency luma signal is modulated by a folding carrier signal. Folding and/or unfolding circuits of a video signal according to the present invention are operated in such a manner that a region of the high-frequency signal to be folded in a field unit is folded on a region of a limited low-frequency bandwidth, and the remaining region of the high-frequency luma signal is folded on the remaining region of the limited low-frequency bandwidth. Then, the full-bandwidth video signal is reproduced by band-compensation,during,reproducing. Therefore, crosstalk between channels can be decreased, thereby providing a clear picture of high resolution.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. In a video recording apparatus for recording a full-bandwidth video signal including a chroma signal and a luma signal on a recording medium having an effective limited bandwidth, a video signal folding circuit comprising:

an input terminal for receiving said video signal from a signal supply source;

a first frequency folder for separating a predetermined first high-frequency luma signal from said video signal input via said input terminal to fold the separated signal on a first low-frequency luma band, thereby generating a first folded luma signal having a limited bandwidth;

a second frequency folder for separating a remaining second high-frequency luma signal while excluding said first high-frequency luma band in said video signal from said input terminal to fold the remaining signal on a second low-frequency luma band exclusive of said first low-frequency luma band, thereby generating a second folded luma signal having a limited bandwidth; and a luma signal recorder that, in recording a given frame of the video signal, alternates, according to a preset period, between recording said first folded luma signal and said second folded luma signal on said recording medium.

2. A video signal folding circuit as claimed in claim 1, wherein:

a frequency range of the first low-frequency luma band is lower in frequency than a frequency range of the second low-frequency luma band;

a frequency range of the first high-frequency luma signal is higher in frequency than a frequency range of the second high-frequency luma signal; and a frequency range of the second low-frequency luma band is lower in frequency than a frequency range of the second high-frequency luma signal.

3. A video signal folding circuit as claimed in claim 1, wherein said luma signal recorder records said first folded luma signal in one field of the given frame and records said second folded luma signal in a further field of the given frame.

4. In a video recording apparatus for recording a full-bandwidth video signal including a chroma signal and a luma signal on a recording medium having an effective limited bandwidth, a video signal folding circuit comprising:

a luma signal separator for separating said luma signal of the full bandwidth from said video signal;

a first bandpass filter for separating a first high-frequency luma signal having a predetermined band in said luma signal of the full bandwidth input from said luma signal separator;

a second bandpass filter for separating a second high-frequency luma signal of a remaining band excluding the first high-frequency band in said luma signal of the full bandwidth input from said luma signal separator;

a selector that alternates between selecting the output of said first bandpass filter and the output of said second bandpass filter according to a predetermined period corresponding to one field of the video signal;

a frequency folder for modulating the high-frequency luma signal selected by said selector by means of a modulated pulse signal to fold the modulated signal on a low-frequency luma signal in said luma signal of the full bandwidth, thereby generating a folded luma signal of a limited bandwidth; and a luma signal recorder for modulating the folded luma signal from said frequency folder to be recorded on said recording medium.

5. A video signal folding circuit as claimed in claim 4, further comprising:

a motion signal detector for detecting a motion signal from said video signal;

a motion signal recorder for AM-modulating said motion signal from said motion signal detector; and a luma/motion signal mixer for mixing said motion signal from said motion signal recorder with said folded luma signal from said frequency folder to output the result to said luma signal recorder.

6. A video signal folding circuit as claimed in claim 4, further comprising:

a chroma signal separator for separating said chroma signal from said video signal;

a chroma signal recorder for performing AM modulation to allow said chroma signal to be recorded on said recording medium; and a chroma/luma signal mixer for mixing said folded luma signal of said luma signal recorder with said chroma signal of said chroma signal recorder to output the resulting mixed signal to a recording device.

7. A video signal folding circuit as claimed in claim 4, wherein said frequency folder comprises:

a modulated pulse signal generator for generating said modulated pulse signal;

a modulator for frequency-translating said high-frequency luma signal from said selector to a low-frequency band by means of said modulated pulse signal;

a horizontal low-pass filter for outputting the low-frequency luma signal; and a mixer for mixing the output of said horizontal low-pass filter with the output of said modulator.

8. A video signal folding circuit as claimed in claim 5, wherein said motion signal detector comprises:

a frame-delay for delaying said luma signal from said luma signal separator by one frame; and a subtractor for detecting a difference signal between said luma signal of a current frame and said luma signal output from said frame-delay.

9. A video signal folding circuit as claimed in claim 8, further comprising a level detector for comparing a level of said motion signal from said subtractor with a preset threshold, thereby generating a logic LOW signal which indicates that said luma signal is a spatially extracted signal when said motion signal is greater than said threshold, and a logic HIGH signal which indicates that said luma signal is a temporally extracted signal when said motion signal is less than said threshold.

10. A video signal folding circuit as claimed in claim 7, wherein said modulated pulse signal generator comprises:

a sync signal separator for separating horizontal and vertical sync signals from said video signal;

a determinator for outputting an odd/even frame discriminating signal, an odd/even field discriminating signal, and an odd/even line discriminating signal by counting said horizontal and vertical sync signals from said sync signal separator;

a parallel-in-serial-out converter for outputting a clock signal having a frequency corresponding to one half a sampling frequency for horizontal frequency-modulation;

a variation detector for resetting said parallel-in-serial-out converter by detecting a variance whenever the field or frame is changed, according to said odd/even frame discriminating control signal and said odd/even field discriminating control signal from said determinator;

a first multiplexer for outputting a modulated clock signal for temporally frequency-modulating said pulse signal by selecting a non-inverted or an inverted output from said parallel-in-serial-out converter, according to said HIGH logic signal from said level detector; and a second multiplexer for further modulating said modulated clock signal with respect to a vertical axis by selecting a non-inverted or an inverted output of said first multiplexer, according to said odd/even line discriminating control signal from said determinator, and outputting said modulated pulse signal.

11. A video signal folding circuit as claimed in claim 8, wherein:

a frequency range of the first low-frequency band is lower in frequency than a frequency range of the second low-frequency band;

a frequency range of the first high-frequency luma band is higher in frequency than a frequency range of the remaining high-frequency luma band; and a frequency range of the second low-frequency band is lower in frequency than a frequency range of the remaining high-frequency luma band.

12. In a video reproducing apparatus for reproducing recorded information as a video signal of a full-bandwidth after recording, alternatingly and according to a predetermined period, a luma signal obtained by folding a first high-frequency luma signal occupying a portion of a high-frequency luma band on a limited first low-frequency band and a luma signal obtained by folding a second high-frequency luma signal occupying the remaining high-frequency luma band on a remaining region of a limited second low-frequency band, on a recording medium having an effective limited bandwidth, a video signal unfolding circuit comprising:

a readout device for reproducing said information recorded on said recording medium;

a first frequency unfolder for unfolding said first high-frequency luma signal folded on said first low-frequency band to its originally occupied band among signals reproduced by said readout device in a first predetermined field; and a second frequency unfolder for unfolding said second high-frequency luma signal folded on said second low-frequency band to its originally occupied band among signals reproduced by said readout device in a second predetermined field.

13. In a video reproducing apparatus for reproducing recorded information as a video signal of a full-bandwidth after recording, alternatingly and according to a predetermined period, a luma signal obtained by folding a first high-frequency luma signal occupying a portion of a high-frequency luma band on a limited first low-frequency band and a luma signal obtained by folding a second high-frequency luma signal occupying the remaining high-frequency luma band on a limited second low-frequency band, on a recording medium having an effective limited bandwidth according to a predetermined period, a video signal unfolding circuit comprising:

- a readout device for reproducing said recorded information recorded on said recording medium;
- a luma signal reproducer for reproducing a luma signal by demodulating said information reproduced by said readout device;
- a frequency unfolder that alternates, according to a predetermined period, between unfolding said first and second high-frequency luma signals folded on said limited first and second low-frequency bands from said luma signal reproducer to their originally occupied band;
- a first bandpass filter for separating said first high-frequency luma signal from said luma signals output from said frequency unfolder;
- a second bandpass filter for separating said second high-frequency luma signal from said luma signals output from said frequency unfolder; and
- a frequency compensator that alternates, in accordance with a period corresponding to a field of the video signal, between mixing said second high-frequency luma signal of said second bandpass filter with said luma signal and first high-frequency luma signal when the signal output from said frequency unfolder is said luma signal and first high-frequency luma signal, and mixing said first high-frequency luma signal of said first bandpass filter with said luma signal and second high-frequency luma signal when the signal output from said frequency unfolder is said luma signal and second high-frequency luma signal.

14. A video signal unfolding circuit as claimed in claim 13, further comprising a chroma signal reproducer for reproducing said chroma signal by demodulating said information reproduced by said readout device.

15. A video signal unfolding circuit as claimed in claim 13, further comprising:

- a motion signal separator for separating a motion signal by frequency-translating said video signal reproduced from said readout device to a predetermined band; and
- a level detector for comparing a level of said motion signal from said motion signal separator with a preset threshold, thereby generating a level signal that either is a logic LOW signal which represents said luma signal being a spatially extracted signal when said motion signal is greater than said threshold or is a logic HIGH signal which represents said luma signal being a temporally extracted signal when said motion signal is less than said threshold.

16. A video signal unfolding circuit as claimed in claim 15, wherein said motion signal separator comprises:

- a horizontal low-pass filter for detecting said low-frequency luma signal below a predetermined band in a digital signal from said luma signal reproducer; and
- an AM demodulator for detecting said motion signal by envelope detection of the signal from said horizontal low-pass filter.

17. A video signal unfolding circuit as claimed in claim 15, wherein said frequency unfolder comprises:

- a temporally adaptive first unfolder for temporally unfolding said high-frequency luma signals folded on said limited low-frequency bands from said luma signal reproducer into their originally occupied bands;
- a spatially adaptive second unfolder for spatially unfolding said high-frequency luma signals folded on said limited low-frequency bands from said luma signal reproducer into their originally occupied bands; and
- a selector for selecting between said first and said second unfolder in accordance with the level signal output by said level detector and thereby outputting the selected signal to said first or to said second bandpass filter.

18. A video signal unfolding circuit as claimed in claim 17, wherein said temporally adaptive unfolder comprises:

- a modulator for frequency-translating said high-frequency luma signals folded on said limited low-frequency luma bands from said luma signal reproducer into their originally occupied band in accordance with a modulated pulse signal;
- a modulated pulse generator for generating said modulated pulse signal;
- a horizontal high-pass filter for passing a luma signal band greater than a frequency corresponding to a horizontally limited bandwidth output from said modulator;
- a vertical high-pass filter for outputting a luma signal vertically greater than one half a maximum vertical frequency in said luma signal from said horizontal high-pass filter; and
- a subtractor for subtracting the output of said vertical high-pass filter from said luma signal of a full bandwidth from said modulator.

19. A video signal unfolding circuit as claimed in claim 17, wherein said spatially adaptive unfolder comprises:

- a modulator for frequency-translating said high-frequency luma signals folded on said limited low-frequency luma bands from said luma signal reproducer into their originally occupied band, in accordance with a modulated pulse signal;
- a modulated pulse generator for generating said modulated pulse signal;
- a horizontal high-pass filter for passing a luma signal band greater than a predetermined band including a luma signal of a horizontally diagonal component from said modulator;
- a vertical high-pass filter for outputting a luma signal vertically greater than one half a maximum vertical frequency in said luma signal from said horizontal high-pass filter; and
- a subtractor for subtracting the output of said vertical high-pass filter from said luma signal of a full bandwidth from said modulator.

20. A video signal unfolding circuit as claimed in claim 17, wherein said frequency compensator comprises:

- a first field memory for storing said first high-frequency luma signal from said first bandpass filter;
- a first adder for mixing the output of said first field memory with the output of said selector;
- a second field memory for storing said second high-frequency luma signal from said second bandpass filter; and
- a second adder for mixing the output of said selector with the output of said second field memory.

21. A video signal unfolding circuit as claimed in claim 18, wherein said modulated pulse generator comprises:

- a sync signal separator for separating horizontal and vertical sync signals from said video signal of said luma signal reproducer;
- a determinator for outputting an odd/even frame discriminating signal, an odd/even field discriminating signal, and an odd/even line discriminating signal by counting said horizontal and vertical sync signals from said sync signal separator;

a parallel-in-serial-out converter for outputting a clock signal having a frequency corresponding to one half a sampling frequency for horizontal frequency modulation;

a variation detector for resetting said parallel-in-serial-out converter by detecting a variance whenever the field or frame is changed, according to said odd/even frame discriminating control signal and said odd/even field discriminating control signal from said determinator;

a first multiplexer for outputting a modulated said pulse signal clock signal for temporally frequency-modulating by selecting a non-inverted or an inverted output from said parallel-in-serial-out converter, according to said logic HIGH signal from said level detector; and a second multiplexer for modulating said modulated clock signal vertical frequency-modulation by selecting a non-inverted or an inverted output of said first multiplexer, according to said odd/even line discriminating control signal from said determinator.

22. In a video recording/reproducing apparatus for recording a full-bandwidth video signal having a chroma signal and a luma signal on a recording medium of an effective limited bandwidth, and reproducing the recorded luma and chroma signals into said full-bandwidth video signal, a folding/unfolding circuit of a video signal comprising:

an input terminal for receiving a video signal from a signal supply source;

a first frequency folder for separating a predetermined first high-frequency luma signal from said video signal input via said input terminal according to a predetermined period to fold the separated signal on a first low-frequency luma band, thereby generating a first folded luma signal having a limited bandwidth;

a second frequency folder for separating a second high-frequency luma signal while excluding said first high-frequency luma signal in said video signal from said input terminal according to a predetermined period to fold the separated signal on a second low-frequency luma band and not on said first low-frequency luma band, thereby generating a second folded luma signal having a limited bandwidth;

a luma signal recorder for modulating said folded luma signals from said first and said second frequency folders by alternating between recording said first folded luma signal and recording said second folded luma signal when recording a given frame of the video signal on said recording medium;

a readout device for reproducing information recorded on said recording medium;

a first frequency unfolder for unfolding said first high-frequency luma signal folded on said first low-frequency luma band to its originally occupied band among signals reproduced by said readout device in a predetermined field; and a second frequency unfolder for unfolding said second high-frequency luma signal folded on said second low-frequency luma band to its originally occupied band among signals reproduced by said readout device in a predetermined field.

23. In a video recording/reproducing apparatus for recording a full-bandwidth video signal having a chroma signal and a luma signal on a recording medium of an effective limited bandwidth, and reproducing the recorded luma and chroma signals into said full-bandwidth video signal, a folding/unfolding circuit of a video signal comprising:

a luma signal separator for separating said luma signal of the full bandwidth from said video signal;

a first bandpass filter for separating a first high-frequency luma signal occupying a predetermined frequency region of said luma signal of the full bandwidth input from said luma signal separator;

a second bandpass filter for separating a second high-frequency luma signal of the remaining frequency region excluding said first high-frequency luma signal in said luma signal of the full bandwidth input from said luma signal separator;

a selector that alternates between selecting the output of said first and said second bandpass filter according to a predetermined period corresponding to one field of the video signal;

a frequency folder for modulating the high-frequency luma signal selected by said selector by means of a modulated carrier signal to fold the modulated signal on a low-frequency luma band, thereby generating a folded luma signal of a limited bandwidth;

a luma signal recorder for modulating said folded luma signal from said frequency folder to be recorded on said recording medium;

a readout device for reproducing signals recorded on said recording medium;

a luma signal reproducer for modulating signals reproduced by means of said readout device to reproduce said luma signal;

a frequency unfolder for unfolding said first or second high-frequency luma signals into their originally occupied bands;

a third bandpass filter for separating said first high-frequency luma signal from said luma signal output from said frequency unfolder;

a fourth bandpass filter for separating said second high-frequency luma signal excluding said first high-frequency luma signal from said luma signal output from said frequency unfolder; and a frequency compensator for mixing said second high-frequency luma signal of said fourth bandpass filter with said luma signal and first high-frequency luma signal when the signal output from said frequency unfolder is said luma signal and first high-frequency luma signal, and mixing said first high-frequency luma signal of said third bandpass filter with said luma signal and second high-frequency luma signal when the signal output from said frequency unfolder is said luma signal and second high-frequency luma signal.

24. In a video recording apparatus for recording a full-bandwidth video signal including a chroma signal and a luma signal on a recording medium having an effective limited bandwidth, a video signal folding method comprising the steps of:

separating a predetermined first high-frequency luma signal from a video signal input to the apparatus;

folding the predetermined signal on a first low-frequency luma band, thereby generating a first folded luma signal having a limited bandwidth;

separating a remaining second high-frequency luma signal, while excluding the luma band of the first high-frequency luma signal in the video signal, from the video signal;

folding the remaining signal on a second low-frequency luma band exclusive of said first low-frequency luma band, thereby generating a second folded luma signal having a limited bandwidth; and in recording a frame of the video signal, alternating between recording the first folded luma signal and the second folded luma signal onto the recording medium according to a preset period.

25. A video signal folding circuit as claimed in claim 24, wherein:

a frequency range of the first low-frequency luma band is lower in frequency than a frequency range of the second low-frequency luma band;

a frequency range of the first high-frequency luma signal is higher in frequency than a frequency range of the second high-frequency luma signal; and a frequency range of the second low-frequency luma band is lower in frequency than a frequency range of the second high-frequency luma signal.

26. In a video reproducing apparatus for reproducing recorded video information from a recording medium having an effective limited bandwidth, the video information being stored as a video signal of a full-bandwidth in which a first luma signal, obtained by folding a first high-frequency luma signal occupying a portion of a high-frequency luma band on a limited first low-frequency band, is alternately recorded with a second luma signal, obtained by folding a second high-frequency luma signal occupying a remaining high-frequency luma band on a second low-frequency band exclusive of the first low-frequency band, a video signal unfolding method, comprising the steps of:

unfolding the first high-frequency luma signal folded on the first low-frequency luma band, thereby restoring the first folded luma signal to its originally occupied band among signals reproduced in a first predetermined field; and unfolding the second high-frequency luma signal folded on the second low-frequency luma band, thereby restoring the second folded luma signal to its originally occupied band among signals reproduced in a second predetermined field.

* * * * *